US012259535B2

(12) United States Patent
Takeda et al.

(10) Patent No.: US 12,259,535 B2
(45) Date of Patent: Mar. 25, 2025

(54) OPTICAL UNIT AND IMAGE DISPLAY DEVICE

(71) Applicant: SEIKO EPSON CORPORATION, Tokyo (JP)

(72) Inventors: Takashi Takeda, Suwa (JP); Masayuki Takagi, Azumino (JP); Kunihiko Yano, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 534 days.

(21) Appl. No.: 17/680,237

(22) Filed: Feb. 24, 2022

(65) Prior Publication Data

US 2022/0276476 A1    Sep. 1, 2022

(30) Foreign Application Priority Data

Feb. 26, 2021    (JP) .................. 2021-029756

(51) Int. Cl.
*G02B 17/00* (2006.01)
*G02B 13/18* (2006.01)
(Continued)

(52) U.S. Cl.
CPC ............. *G02B 17/08* (2013.01); *G02B 13/18* (2013.01); *G02B 27/0172* (2013.01); *G09G 3/002* (2013.01); *G02B 2027/011* (2013.01)

(58) Field of Classification Search
CPC ...... G02B 5/08; G02B 17/002; G02B 17/004; G02B 17/006; G02B 17/008; G02B 17/023; G02B 17/02; G02B 17/026; G02B 17/045; G02B 17/08; G02B 17/0804; G02B 17/0808; G02B 17/0812; G02B 17/0816; G02B 17/082; G02B 17/0824; G02B 17/0828; G02B 17/0832; G02B 17/0836; G02B 17/084; G02B 17/0844;
(Continued)

(56) References Cited

U.S. PATENT DOCUMENTS

2012/0200937 A1    8/2012  Totani et al.
2013/0335828 A1   12/2013  Totani et al.
(Continued)

FOREIGN PATENT DOCUMENTS

CN    102628988    8/2012
CN    106019528   10/2016
(Continued)

*Primary Examiner* — Henry Duong
(74) *Attorney, Agent, or Firm* — JCIPRNET

(57) ABSTRACT

An optical unit and an image display device include a display element configured to emit imaging light, a first mirror having partial transparency and configured to reflect a portion of the imaging light emitted from the display element, and a second mirror configured to return the imaging light reflected by the first mirror to the first mirror to form an exit pupil. The imaging light is incident on the first mirror from the display element at a first incident angle, and the imaging light is incident on the first mirror at a second incident angle that is smaller than the first incident angle from the second mirror, and the first mirror includes an angle dependent separation film that shows different separation characteristics for the imaging light according to the difference between the first incident angle and the second incident angle.

17 Claims, 12 Drawing Sheets

(51) Int. Cl.
*G02B 17/08* (2006.01)
*G02B 27/01* (2006.01)
*G09G 3/00* (2006.01)

(58) Field of Classification Search
CPC ............ G02B 17/0848; G02B 17/0852; G02B 17/0856; G02B 17/086; G02B 17/0864; G02B 17/0868; G02B 17/0872; G02B 17/0876; G02B 17/088; G02B 17/0884; G02B 17/0888; G02B 17/0892; G02B 17/0896; G02B 13/18; G02B 27/0172; G02B 2027/011; G02B 2027/0178; G02B 27/017; G09G 3/002
USPC .......................................... 359/730
See application file for complete search history.

(56) References Cited

U.S. PATENT DOCUMENTS

| | | | |
|---|---|---|---|
| 2015/0277129 A1* | 10/2015 | Hua | G02B 27/106 359/462 |
| 2016/0306174 A1 | 10/2016 | Totani et al. | |
| 2017/0176751 A1 | 6/2017 | Ouderkirk et al. | |
| 2017/0299871 A1 | 10/2017 | Totani et al. | |
| 2019/0129175 A1 | 5/2019 | Amitai et al. | |
| 2020/0018966 A1 | 1/2020 | Komatsu et al. | |
| 2020/0096773 A1 | 3/2020 | Amitai et al. | |
| 2020/0117011 A1 | 4/2020 | Amitai et al. | |
| 2020/0124854 A1 | 4/2020 | Amitai et al. | |
| 2020/0124855 A1 | 4/2020 | Amitai et al. | |
| 2020/0124859 A1 | 4/2020 | Amitai et al. | |
| 2021/0149204 A1 | 5/2021 | Amitai et al. | |
| 2022/0107499 A1 | 4/2022 | Amitai | |
| 2022/0365352 A1 | 11/2022 | Amitai et al. | |
| 2023/0084364 A1* | 3/2023 | Dong | G02B 27/0172 359/630 |
| 2023/0221565 A1 | 7/2023 | Amitai et al. | |
| 2023/0359033 A1* | 11/2023 | Iba | G02B 27/02 |

FOREIGN PATENT DOCUMENTS

| | | |
|---|---|---|
| CN | 110703441 | 1/2020 |
| JP | H1195160 | 4/1999 |
| JP | 2001108933 | 4/2001 |
| JP | 2017514168 | 6/2017 |
| JP | 2019507391 | 3/2019 |
| JP | 2020034722 | 3/2020 |
| WO | WO-2019106969 A1 * | 6/2019 |
| WO | 2020157747 | 8/2020 |

* cited by examiner

OPTICAL UNIT AND IMAGE DISPLAY DEVICE

The present application is based on, and claims priority from JP Application Serial Number 2021-029756, filed Feb. 26, 2021, the disclosure of which is hereby incorporated by reference herein in its entirety.

BACKGROUND

1. Technical Field

The present disclosure relates to an optical unit and an image display device including an optical unit that enable observation of a virtual image formed by a display element or the like.

2. Related Art

As equivalents of an optical unit that enables observation of a virtual image or an image display device (virtual image display device) incorporating the optical unit, a head-mounted display device in which light (an image) from an LCD as a display element is reflected by a half mirror and is incident on a lens having a reflection function, and imaging light reflected by the lens is transmitted by the half mirror, thereby allowing an observer to visually recognize thereof is known (JP-A-2001-108933).

In the device of JP-A-2001-108933, regarding loss of the amount of light, for example, even only for passage of the half mirror, there are two passes of the reflection of the light emitted from the LCD and the transmission of the light reflected by the lens. For this reason, in order to improve efficiency of light utilization, for example, even when the reflectance of the half mirror is set to 50% (transmittance is also 50%), the amount of light decreases to 14 or less through the two passes.

SUMMARY

An optical unit according to an aspect of the present disclosure includes a display element configured to emit imaging light, a first mirror on which the imaging light is incident at a first angle from the display element, and configured to reflect a portion of the imaging light, and a second mirror configured to return the imaging light reflected by the first mirror toward the first mirror to form an exit pupil, and to cause the imaging light to be incident on the first mirror at a second angle that is smaller than the first angle, and the first mirror includes an angle dependent separation film that shows different separation characteristics for the first angle and the second angle.

DESCRIPTION OF EXEMPLARY EMBODIMENTS

First Embodiment

Hereinafter, the structure, operation, and the like of an optical unit according to the present disclosure and an image display device incorporating the optical unit will be described with reference to FIG. 1 and the like.

Figure 1:
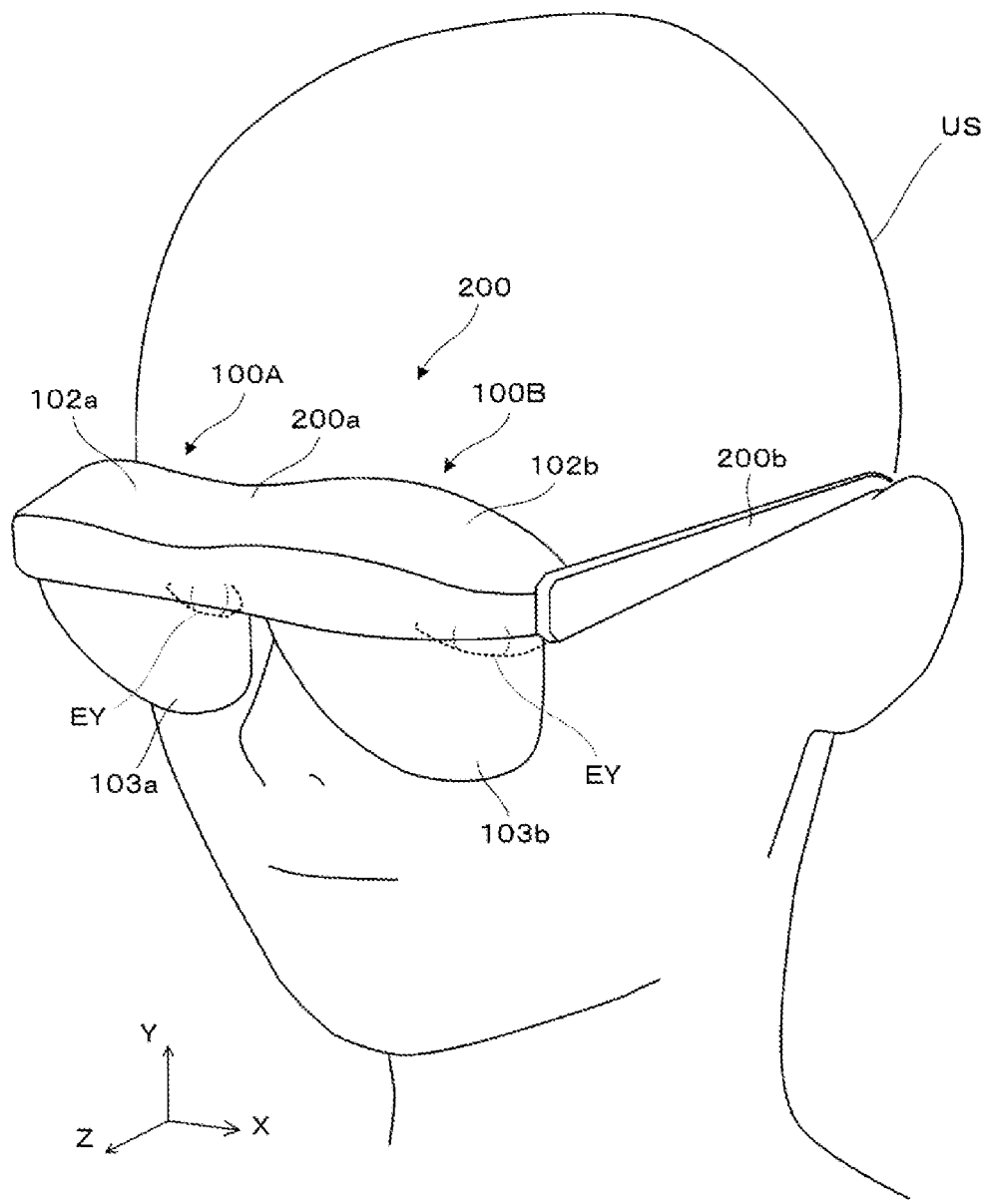
FIG. 1 is an external perspective view illustrating a mounted state of an image display device according to a first embodiment.

FIG. 1 is a diagram illustrating a mounted state of an image display device 200. The image display device 200 is a head-mounted display (hereinafter, also referred to as "HMD"), and the HMD 200 allows an observer or wearer US who is wearing the HMD 200 to be able to recognize an image as a virtual image. That is, it can be said that the image display device 200 is a virtual image display device. In FIG. 1 and the like, X, Y, and Z are an orthogonal coordinate system, a +X direction corresponds to a transverse direction in which the two eyes EY of an observer or wearer US who is wearing the image display device (or the HMD) 200 or a display device 100 are disposed, a +Y direction corresponds to an upward direction orthogonal to the transverse direction in which the two eyes EY of the wearer US are disposed, and a +Z direction corresponds to a direction to the front or a forward direction for the wearer US. A ±Y direction is parallel to a vertical axis or a vertical direction.

The image display device 200 includes a main body 200a arranged so as to cover the front of the wearer US, and a pair of temple-shaped support devices 200b that support the main body 200a. The main body 200a includes a first display device 100A for the right eye and a second display device 100B for the left eye when viewed functionally. The first display device 100A includes a first display drive unit 102a and a combiner 103a that has a spectacle lens shape and covers the front of the eye. Similarly, the second display device 100B includes a second display drive unit 102b disposed at an upper portion thereof, and a combiner 103b that has a spectacle lens shape and covers the front of the eye.

Figure 2:
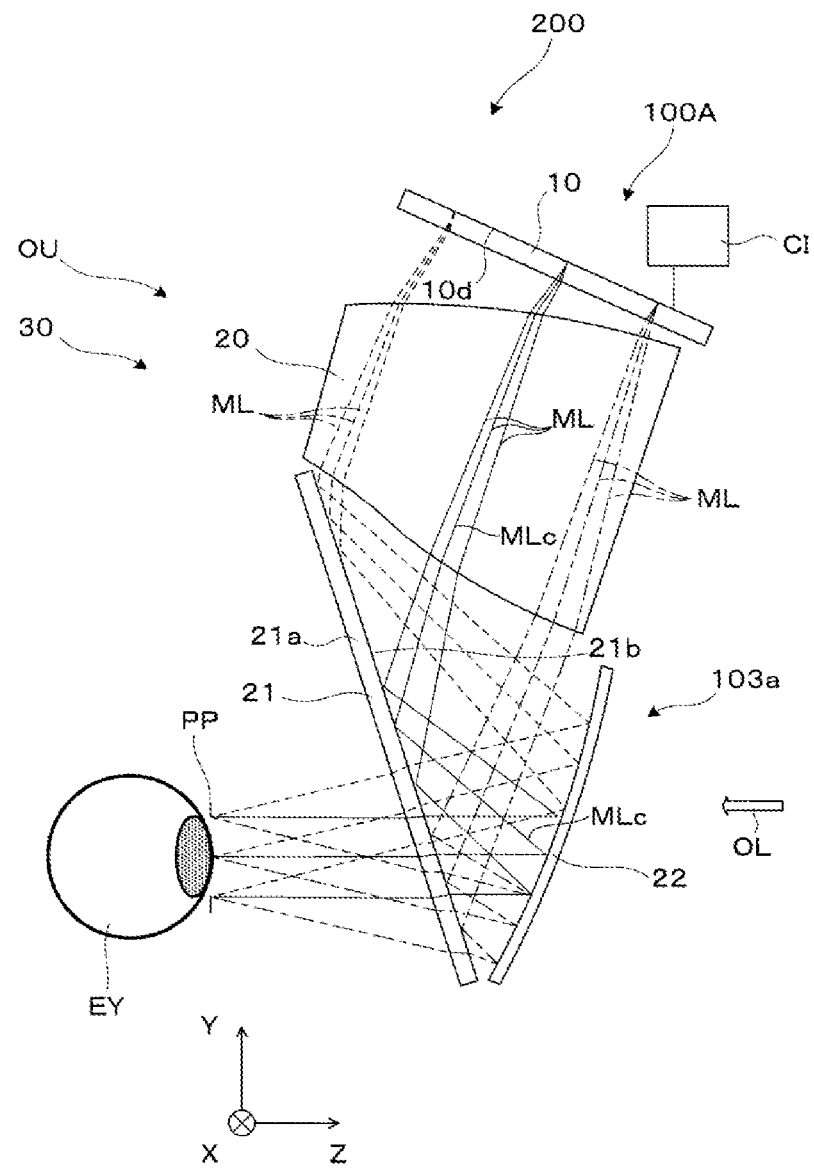
FIG. 2 is a conceptual side cross-sectional view for describing an internal optical system of the image display device.

With reference to FIG. 2, an optical unit OU, which is a portion having an optical function among each part of the image display device 200, will be described. Of the left-right symmetric first display device 100A and second display device 100B (see FIG. 1) constituting the image display device 200, the first display device 100A is illustrated as a representative in the example of FIG. 2. Here, the optical unit OU as an optical structure in the first display device 100A will be described with reference to a side cross-sectional view illustrated in FIG. 2. Since the second display device 100B for the left eye (see FIG. 1) is the same as the first display device 100A, detailed description and the like thereof will be omitted.

As illustrated in FIG. 2, the optical unit OU includes a display element 10 and an imaging optical system 30 as a portion having an optical function of the first display device 100A for the right eye. The imaging optical system 30 is also referred to as a light guide optical device. The imaging optical system 30 includes a projection lens 20, which is a projection optical system, a first mirror 21, and a second mirror 22. For example, the display element 10, the projection lens 20, and the first mirror 21 correspond to the first display drive unit 102a in FIG. 1, and the second mirror 22 corresponds to the first combiner 103a in FIG. 1.

The display element 10 is, for example, a self-luminous type display device, and includes a light emitting unit in order to generate imaging light ML. The display element 10 is constituted by, for example, an organic electroluminescence (EL) display. Here, as an example, the display element 10 is constituted by an organic EL display, so that unpolarized light is emitted from a display surface 10d as the imaging light ML, that is, a color still image or video is formed on the two-dimensional display surface 10d. However, the display element 10 is not limited to the above-described aspect using the organic EL display, and can be replaced with a display device using a micro LED display or inorganic EL, an organic LED, a laser array, a quantum dot light emission element, or the like. Further, the display element 10 is not limited to a self-luminous type imaging light generation device, and may include an LCD and another light modulation element, and may form an image by illuminating the light modulation element with a light source (light emitting unit) such as a backlight. As the display element 10, a liquid crystal on silicon (LCOS) (LCoS is a registered trademark), a digital micro-mirror device, or the like may be used instead of an LCD. The display element 10 is provided with a control circuit CI that performs various controls regarding the emission of imaging light ML, for example.

Of the imaging optical system 30, the projection lens 20 is a projection optical system that causes the imaging light ML emitted from the display element 10 to pass therethrough and then to be incident on the first mirror 21. The projection lens 20 is constituted by a single lens or a plurality of lenses, but in the illustrated example, the projection lens 20 is illustrated by one lens to be simplified. Note that it is conceivable that the projection lens 20 is designed as an aberration correction optical system that corrects aberrations generated in the second mirror 22, which will be described later, or as that including the aberration correction optical system.

Of the imaging optical system 30, the first mirror 21 is a flat mirror (half mirror) having partial transparency (semi-transparency), that is, is an optical member having a flat plate shape, and is arranged on the light emission side of the projection lens 20. In the first mirror 21, an angle dependent separation film 21b that shows different separation characteristics according to an incident angle of the light is formed on one surface of a parallel flat plate 21a having a uniform thickness and having transparency, thereby it functions as a flat transparent reflection surface that reflects and transmits a portion of the imaging light ML emitted from the projection lens 20 and incident on the first mirror 21. It is conceivable that the angle dependent separation film 21b is a dielectric multilayer film constituted by a combination of $Nb_2O_5$—$Al_2O_3$—$SiO_2$, for example, in order to be a film configuration having substantially no absorption and no polarization dependence.

Of the imaging optical system 30, the second mirror 22 is a concave mirror (half mirror) having partial transparency (semi-transparency), that is, is an optical member having a curved plate shape. The second mirror 22 is arranged so as to face the first mirror 21 on the +Z side of the first mirror 21 with respect to a pupil position PP that indicates the position of an exit pupil that is assumed to be the position of the eye EY, and returns a portion of the imaging light ML that has been reflected by the first mirror 21 toward the pupil position PP. The imaging light ML returned by the second mirror 22, which is the concave mirror, is collimated and directed toward the first mirror 21, and further passes through the first mirror 21 (partially transmitted therethrough) to reach the pupil position PP. The pupil position PP is a position at which the imaging light ML from each of points on the display surface 10a is incident thereon to overlap from an angular direction corresponding to a position of each of points on the display surface 10a in a predetermined divergent state or a parallel state.

Here, the second mirror 22 is an eccentric optical system (asymmetric optical system), and for example, when main light beam MLc of the center pixel of the display element 10 is reflected by the first mirror 21 and is directed toward the second mirror 22, the main light beam MLc is not vertically incident on the second mirror 22, but is incident on a reflection surface of the second mirror 22 with a predetermined incident angle. Therefore, when the main light beam MLc bent (reflected) by the second mirror 22 enters again the first mirror 21, an incident angle is different from that of the first incidence. Details of these will be described later with reference to FIG. 3 and the like.

Further, in the case of the above-described aspect, the second mirror 22 generates aberration (distortion aberration) due to eccentricity. Regarding this, as described above, for example, it is conceivable that the projection lens 20 may be configured to include the aberration correction optical system for correcting the aberration.

As described above, in the present embodiment, an incident angle (first incident angle) when the imaging light ML is reflected by the first incident on the first mirror 21, is different from an incident angle (second incident angle) when the imaging light ML is transmitted through the first mirror 21 by the second incident in which the imaging light ML that has passed through the second mirror 22 is directed toward the first mirror 21 again. On the other hand, the angle dependent separation film 21b, which has characteristics in which separation characteristics of light separation differ depending on the incident angle, is configured to be responsible for the reflection and transmission in the first mirror 21. As a result, the optical unit OU and the image display device 200 enable highly efficient use of the imaging light ML.

Since the second mirror 22 has partial transparency to partially transmit external light OL from externals therethrough while returning the portion of the imaging light ML reflected by the first mirror 21 as described above, the second mirror 22 functions as the combiner 103a. That is, in the image display device 200, a see-through type optical system that superimposes the imaging light ML and the external light OL to be visually recognized is formed.

Figure 3:
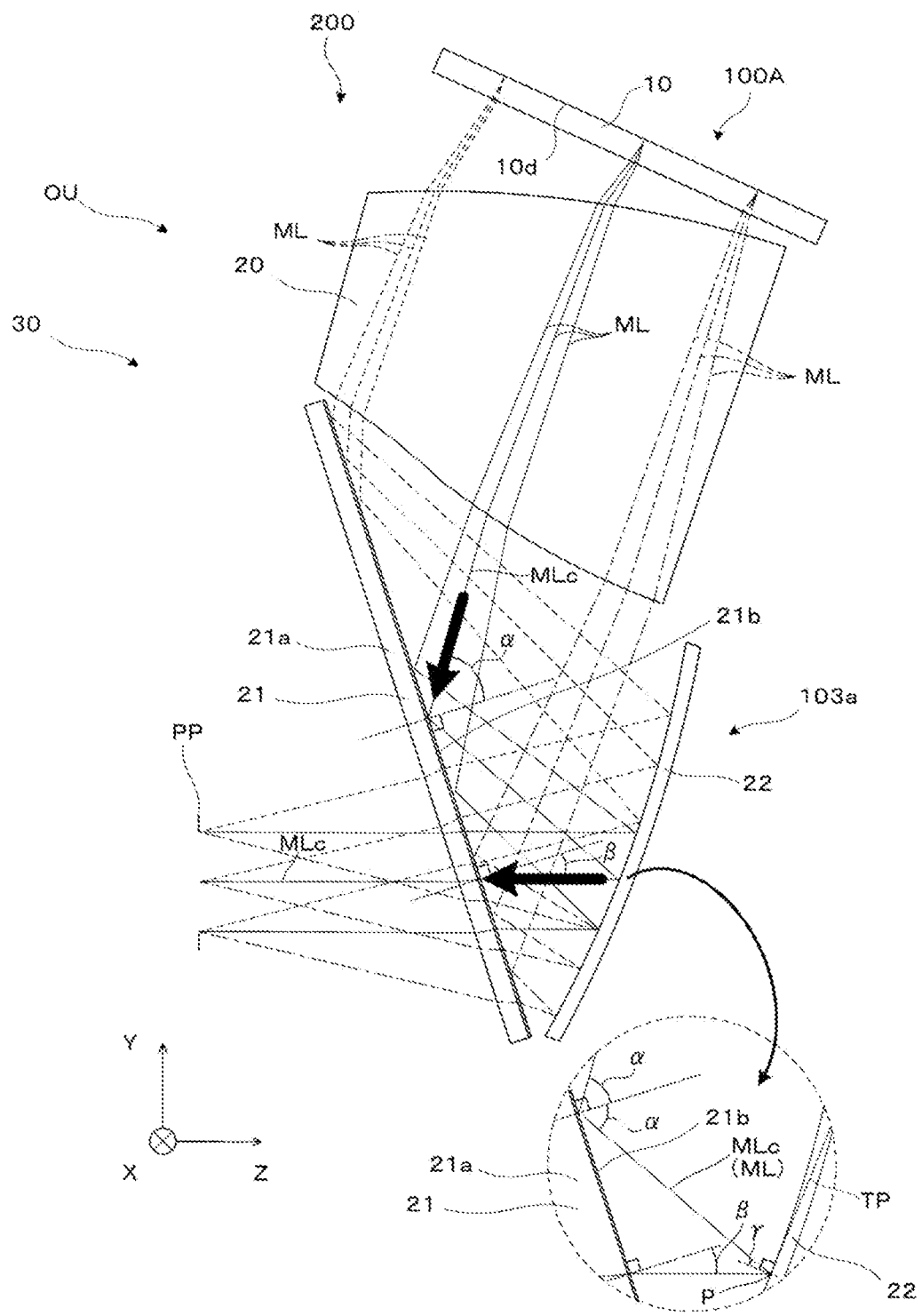
FIG. 3 is a diagram illustrating the relationship between a first incident angle and a second incident angle with respect to a first mirror.

Next, functions and operations of each part will be described in more detail along an optical path of the imaging light ML with reference to FIG. 3 and the like. First, as illustrated in FIG. 3, the imaging light ML emitted from each point of the display surface 10d of the display element 10 as a display panel is projected toward the first mirror 21 by the projection lens 20. That is, the imaging light ML that has passed through the projection lens 20 is incident on the first mirror 21. Here, the incident angle of the imaging light ML emitted from the projection lens 20 on the first mirror 21 is referred to as a first incident angle α. In the illustrated example, as a representative of the imaging light ML, the main light beam MLc of the center pixel of the display element 10 is illustrated as the first incident angle α, but the first incident angle α is the same for the other components constituting the imaging light ML.

A partial component of the imaging light ML incident on the first mirror 21 at the first incident angle α is reflected thereby and directed toward the second mirror 22. Here, by providing the angle dependent separation film 21b with the light separation characteristics that correspond to the first incident angle α, it is possible to obtain an aspect in which the imaging light ML is reflected with high efficiency (for example, greater than 50%) when the imaging light ML is reflected by the angle dependent separation film 21b of the first mirror 21. This is not limited to the first incident angle α for the main light beam MLc, but the same applies to the other components of the imaging light ML.

As described above, the second mirror 22 is an eccentric optical system, and the imaging light ML is directed toward the first mirror 21 at an incident angle different from the first incident angle α. To describe an example more specifically, as illustrated in a partially enlarged manner, for example, the main light beam MLc of the imaging light ML is emitted from the first mirror 22 at the same angle as the first incident angle α by the reflection on the first mirror 22 having a planar shape, and is incident on the second mirror 22 not perpendicular but with an angle γ (>0) to a tangent plane TP of the second mirror 22 at an incident position P of the second mirror 22. Summarizing the above by tracing the path of the main light beam MLc, the main light beam MLc is emitted from the display element 10 to the first mirror 21 at the first incident angle α, and the main light beam MLc reflected from the first mirror 21 is incident on the second mirror 22 at the angle γ with respect to a normal line of the tangent plane TP of the second mirror 22, at the incident position P where the main light beam MLc is incident on the second mirror 22. As a result, after being returned back by the second mirror 22, the main light beam MLc is incident on the first mirror 21 at a second incident angle β that is different from the first incident angle α. The second incident angle β is smaller than the first incident angle α, and by providing the angle dependent separation film 21b with the light separation characteristics that correspond to the second incident angle β (≤α), it is possible to obtain an aspect in which the imaging light ML is transmitted with high efficiency (for example, greater than 50%). Regarding the imaging light ML, the second mirror 22 causes not only the main light beam MLc but also other components to be incident on the first mirror 21 at the second incident angle β smaller than the first incident angle α. As a result, using efficiency can be similarly improved not only for the second incident angle β in the main light beam MLc but also for the other components of the imaging light ML.

Figure 4:
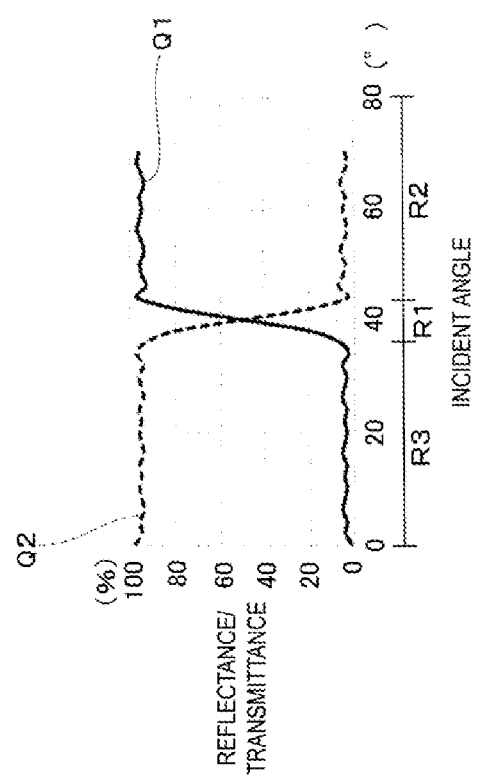
FIG. 4 is a graph illustrating an example of separation characteristics of an angle dependent separation film.

FIG. 4 is a graph illustrating an example of the separation characteristics of the angle dependent separation film 21b for light in a specific visible light wavelength band. In the figure, the horizontal axis indicates an incident angle (unit: °), and the vertical axis indicates a light reflectance or transmittance with respect to the incident angle (unit: %). A curved line Q1 illustrated by a solid line illustrates the reflection characteristics of the angle dependent separation film 21b. That is, for the curved line Q1, the vertical axis indicates the light reflectance. On the other hand, a curved line Q2 illustrated by a dashed line illustrates the transmission characteristics of the angle dependent separation film 21b. That is, for the curved line Q2, the vertical axis indicates the light transmittance. As illustrated, in an example illustrated in the graph, as illustrated in the curved lines Q1 and Q2, with a predetermined angle range R1 including the incident angle around 40° as a boundary, reflectance is high (for example, greater than 90%) and transmittance is low in an angle range R2 where the angle value is greater than the angle range R1. On the other hand, transmittance is high (for example, greater than 90%) and reflectance is low in an angle range R3 where the angle value is smaller than the angle range R1. By having such characteristics, the angle dependent separation film 21b can have characteristics of having a high reflectance for the component incident at the first incident angle α, which is a relatively large angle, and having a high transmittance for the component incident at the second incident angle β, which is a relatively small angle.

Next, with reference to FIG. 5, an example of separation by the angle dependent separation film 21b with respect to the first incident angle α and the second incident angle β for the total field of view (FOV) in the imaging light ML from the display element 10 will be discussed. Here, assuming that the rectangular display surface 10d of the display element 10 has an aspect ratio of 16:9, and the total field of view (FOV) in the diagonal direction is approximately 50° (for example, 52°), and an image (virtual image) corresponding thereto is visible. Assuming that the angle dependent separation film 21b has the separation characteristics described with reference to FIG. 4, and the imaging light ML is also constituted by light such that the angle dependent separation film 21b shows the above-described characteristics.

Figure 5:
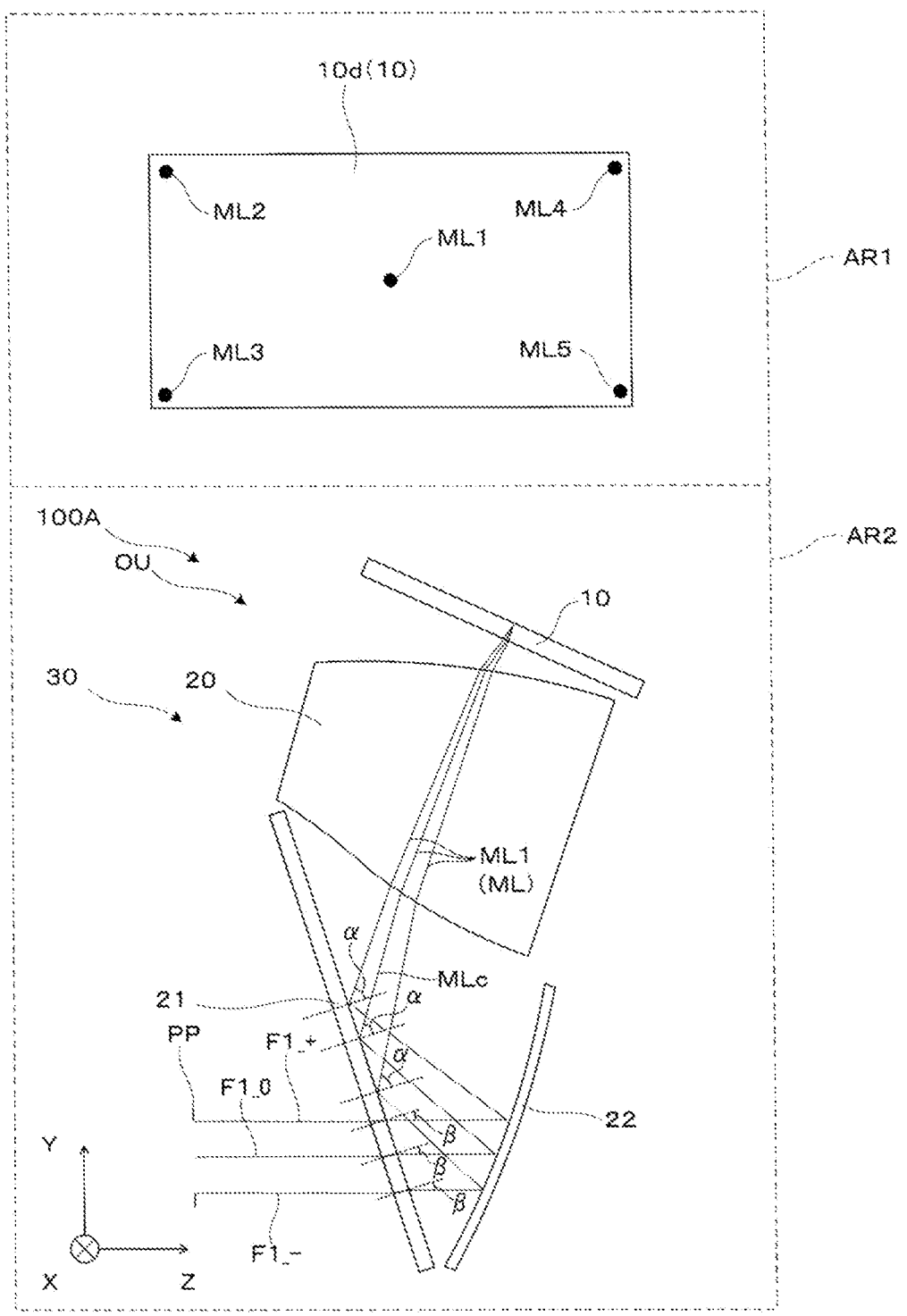
FIG. 5 is a conceptual diagram for describing an incident angle of imaging light according to an field of view.

In the above case, as illustrated in a first region AR1 in FIG. 5, the component of the imaging light ML emitted from the center pixel of the rectangular display surface 10d (display element 10) is referred to as component light ML1, and the component of the imaging light ML emitted from four corners of the rectangular display surface 10d is referred to as component light ML2 to ML5. Note that in the figure, the component light ML1 to ML5 are illustrated as light emission points.

Further, for each component light ML1 to ML5, a component of the main light beam and a component on the peripheral side other than the main light beam are distinguished. Specifically, as illustrated in a second region AR2 in FIG. 5, in the component light ML1, the component corresponding to the main light beam MLc is referred to as component light F1_0, and the component corresponding to an end on +Y side (upper end) is referred to as component light F1_+, and the component corresponding to an end on the −Y side (lower end) is referred to as component light F1_−. Similarly, for the component light ML2 to ML5, component light F2_0 to F5_− are defined, and measurement results of the first incident angle α and the second incident angle β for these are summarized in Table 1.

TABLE 1

| | INCINDENT ANGLE ON FIRST MIRROR 21 | |
|---|---|---|
| COMPONENT LIGHT | α (REFLECTION) | β (TRANSMISSION) |
| F1_0 | 54.9 | 17 |
| F1_+ | 51 | 16.2 |
| F1_− | 58.4 | 17.8 |
| F2_0 | 61.2 | 2.7 |

TABLE 1-continued

INCIDENT ANGLE ON FIRST MIRROR 21

| COMPONENT LIGHT | α (REFLECTION) | β (TRANSMISSION) |
|---|---|---|
| F2_+ | 57.5 | 1.9 |
| F2_− | 64.7 | 3.4 |
| F3_0 | 47.4 | 31.4 |
| F3_+ | 44.8 | 30.6 |
| F3_− | 49.5 | 32.2 |
| F4_0 | 60 | 21.1 |
| F4_+ | 56.2 | 21.1 |
| F4_− | 63.7 | 21.1 |
| F5_0 | 47.8 | 36.8 |
| F5_+ | 45.3 | 36.2 |
| F5_− | 49.8 | 37.3 |
| MAX | 64.7 | 37.3 |
| MIN | 44.8 | 1.9 |

Note that in Table 1, max and min indicate the maximum value and the minimum value of the first incident angle α and the second incident angle β from the component light F1_0 to F5_−, which correspond to the maximum value and the minimum value of the first incident angle α and the second incident angle β for the total field of view (FOV). In this example, the minimum angle of the first incident angle α is 44.8° of the component light F3_+, and this is greater than 37.3° of the component light F5_− which is the maximum angle of the second incident angle β. From a different point of view, in the case of the above-described aspect, there is no component incident on the first mirror 21 in an angle range of 37.3° to 44.8°. Therefore, the angle range R1, in the separation characteristics of the angle dependent separation film 21b illustrated in FIG. 4, is designed to be a range narrower than 37.3° to 44.8°. In other words, the angle dependent separation film 21b shows different reflection and transmission characteristics between the maximum angle (37.3°) of the second incident angle β and the minimum angle (44.8°) of the first incident angle α. As a result, the imaging light ML incident at the first incident angle α can be efficiently reflected, and the imaging light ML incident at the second incident angle β can be efficiently transmitted. More specifically, in the example of FIG. 4, in the angle dependent separation film 21b, the reflectance from the incident angle of 44° to 70° is equal to or greater than 90%, and the transmittance from the incident angle of 0° to 38° is equal to or greater than 90%. In this case, even when the imaging light ML is reflected by the first mirror 21 and transmitted therethrough again, the total loss of the two times in only the first mirror 21 is equal to or less than 20% (1−0.9×0.9=0.19). For example, assuming that, conventionally, the reflection transmittance was 50% and the loss was 75% (1−0.5×0.5=0.75), loss is suppressed to approximately ⅓.

Here, in the case of the above-described example, the angle difference between 44.8°, which is the minimum angle of the first incident angle α, and 37.3°, which is the maximum angle of the second incident angle β, is 5° or more. Therefore, the angle dependent separation film 21b having highly efficient separation characteristics can be configured by a relatively simple structure (for example, a dielectric multilayer film constituted by several tens of layers having a structure as in the above example). Note that from the viewpoint of film design, at least in the component of the imaging light ML emitted from the display element 10 as light beam having the same field of view, the difference between the first incident angle α and the second incident angle β is preferably equal to or greater than 5 degrees. In the example described above, since the angle difference between the minimum angle of the first incident angle α and the maximum angle of the second incident angle β of the total field of view is equal to or greater than 5°, this condition is of course satisfied.

Further, in the above case, the minimum angle of the first incident angle α is greater than the maximum angle of the second incident angle β, and in the first mirror 21, the reflectance with respect to the incidence of the imaging light ML at the first incident angle α is equal to or greater than 50%, and the reflectance of with respect to the incidence of the imaging light ML at the second incident angle β is less than 50%. As a result, at least, assuming that the reflectance is 50% (transmittance is also 50%), it is possible to use light with higher efficiency than when the amount of light is reduced to ¼ or less by passing through the first mirror 21 twice.

Figure 6:
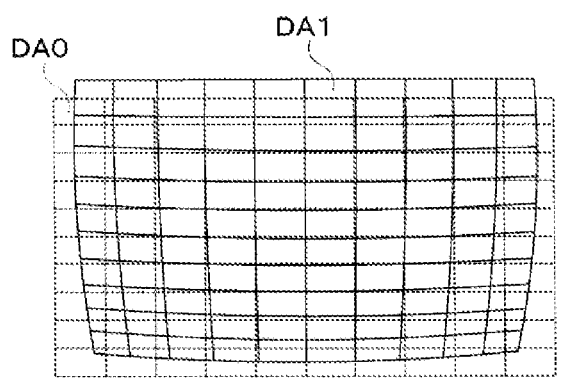
FIG. 6 is a diagram for describing distortion correction of a display image.

Further, in the example described above, since the second mirror 22 is eccentric and the imaging optical system 30 is an off-axis optical system, distortion (distortion aberration) such as trapezoidal distortion occurs in the optical system itself. On the other hand, as described above, it is conceivable that, in the imaging optical system 30, the projection lens 20 includes the aberration correction optical system that corrects the aberration. Further, when it is not easy to remove the generated distortion (distortion aberration), as illustrated in FIG. 6, a display image formed on the display surface 10d of the display element 10 is set to a corrected image DA1 that is preliminary distorted as in a grid pattern indicated by solid lines and to have reverse distortion that cancels the distortion formed by the imaging optical system 30. As a result, a virtual image observed at the pupil position PP through the imaging optical system 30 can be a grid pattern corresponding to an original display image DA0 illustrated by dashed lines. Therefore, an image outline as the virtual image finally visually recognized can be rectangular. Note that, for the display image formed on the display surface 10d, besides an aspect in which the display surface 10d is set not to have a rectangular shape but to have a shape according to the distortion from the beginning, an aspect in which control of a region used for display (display region) in the rectangular display surface 10d is performed by the control circuit CI of the display element 10, and the like, can be considered. As described above, it can be considered that the display element 10 is set to have a display surface distorted according to the aberration generated in the imaging optical system 30 which is the subsequent optical system, or the display region of the display surface 10d is configured to be controlled by the control circuit IC in advance according to the aberration of the imaging optical system 30 which is the subsequent optical system.

Figure 7:
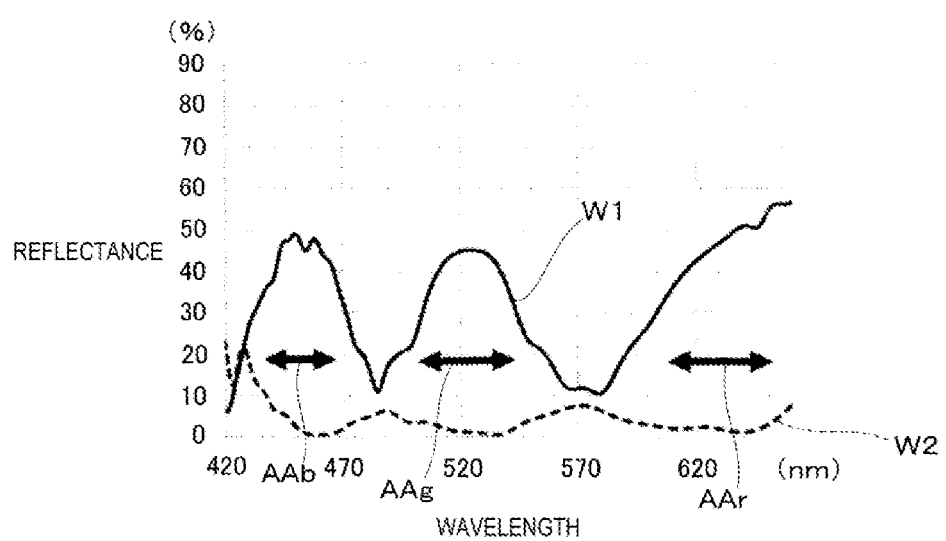
FIG. 7 is a graph illustrating an example of the relationship between a light wavelength band and a reflectance with respect to the first mirror.

Next, the relationship between the optical wavelength band of the imaging light ML and the reflectance with respect to the first mirror 21 will be described with reference to a graph illustrating an example in FIG. 7. In the graph of FIG. 7, a horizontal axis indicates a wavelength (unit: nm), and a vertical axis indicates a light reflectance.

When an organic EL display is employed as the display element 10 as in the above example, for example, when a color image is formed by light including a red wavelength band, a green wavelength band, and a blue wavelength band, the imaging light ML is constituted by broad light in which the red wavelength band, the green wavelength band, and the blue wavelength band have a certain wavelength bandwidth as illustrated by reciprocating arrows AAr, AAg, and AAb in FIG. 7. Regarding the polarization characteristics, it is assumed that the light is unpolarized, specifically, for example, the display element 10 emits, as the imaging light ML, light including a plurality of polarization directions with respect to the light incident surface of the first mirror 21, and in which a difference of the light amount between the polarization directions is equal to or less than 50%.

On the other hand, for example, when the angle dependent separation film 21b is a dielectric multilayer film constituted by a combination of $Nb_2O_5$—$Al_2O_3$—$SiO_2$, as described above, it is possible to show the characteristics illustrated by curved lines W1 and W2 in FIG. 7 with respect to the light in the unpolarized state described above, that is, the light having a state in which P-polarized light or S-polarized light is appropriately mixed. Specifically, first, the curved line W1 illustrated by a solid line shows the reflection characteristics of each wavelength for the component incident at an average angle with respect to the angle range of the first incident angle α illustrated in Table 1. In this case, the reflectance is equal to or greater than a predetermined value for the wavelength band of each color illustrated by the reciprocating arrows AAr, AAg, and AAb, and in particular, at the most efficient wavelength of each color, the reflection characteristic close to approximately 50% is obtained.

Next, the curved line W2 illustrated by a dashed line shows the reflection characteristics (transmission characteristics) of each wavelength for the component incident at an average angle with respect to the angle range of the second incident angle β illustrated in Table 1. In this case, the angle dependent separation film 21b has a configuration in which there is almost no absorption of light, and the reflection characteristic is sufficiently suppressed, and a high transmission characteristic is obtained.

As described above, the optical unit OU and the image display device 200 including the optical unit OU according to the present embodiment include the display element 10 configured to emit the imaging light ML, the first mirror 21 having partial transparency and configured to reflect a portion of the imaging light ML emitted from the display element 10, and the second mirror 22 configured to return the imaging light ML reflected by the first mirror 21 toward the first mirror 21 to form the exit pupil PP. The imaging light ML is incident on the first mirror 21 at the first incident angle α from the display element 10, and imaging light ML is incident on the first mirror 21 from the second mirror 22 at the second incident angle β that is smaller than the first incident angle α, and the first mirror 21 includes the angle dependent separation film 21b that shows different separation characteristics for the imaging light ML according to the difference between the first incident angle α and the second incident angle β. In this case, in the optical unit OU, the incident angles are made different when the imaging light ML passes through the first mirror 21 twice, and the angle dependent separation film 21b that shows different separation characteristics according to the difference in the incident angles is provided to adjust the reflection and transmission characteristics, so that the efficiency of utilizing the imaging light ML can be improved.

Next, an overview of the difference in schematic structure between an image display device of a prior art (comparative example) and the image display device 200 of the present embodiment will be described with reference to FIGS. 8 and 9. Here, as a representative of an optical path of the imaging light ML from the display element 10, an optical path of the main light beam MLc of the center pixel of the display element 10 is illustrated.

Figure 8:
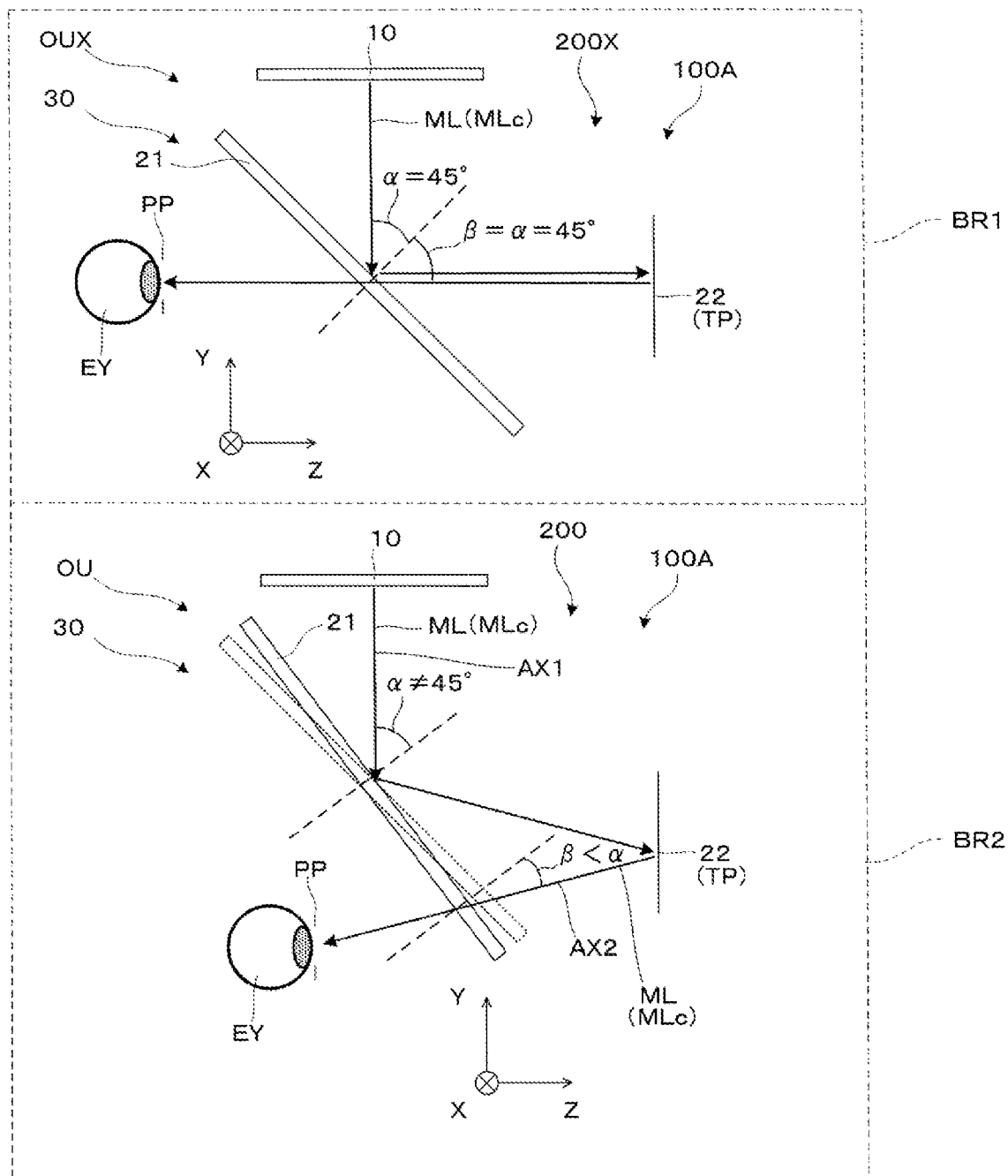
FIG. 8 is a conceptual side cross-sectional view for describing a schematic structure of the image display device.
Figure 9:
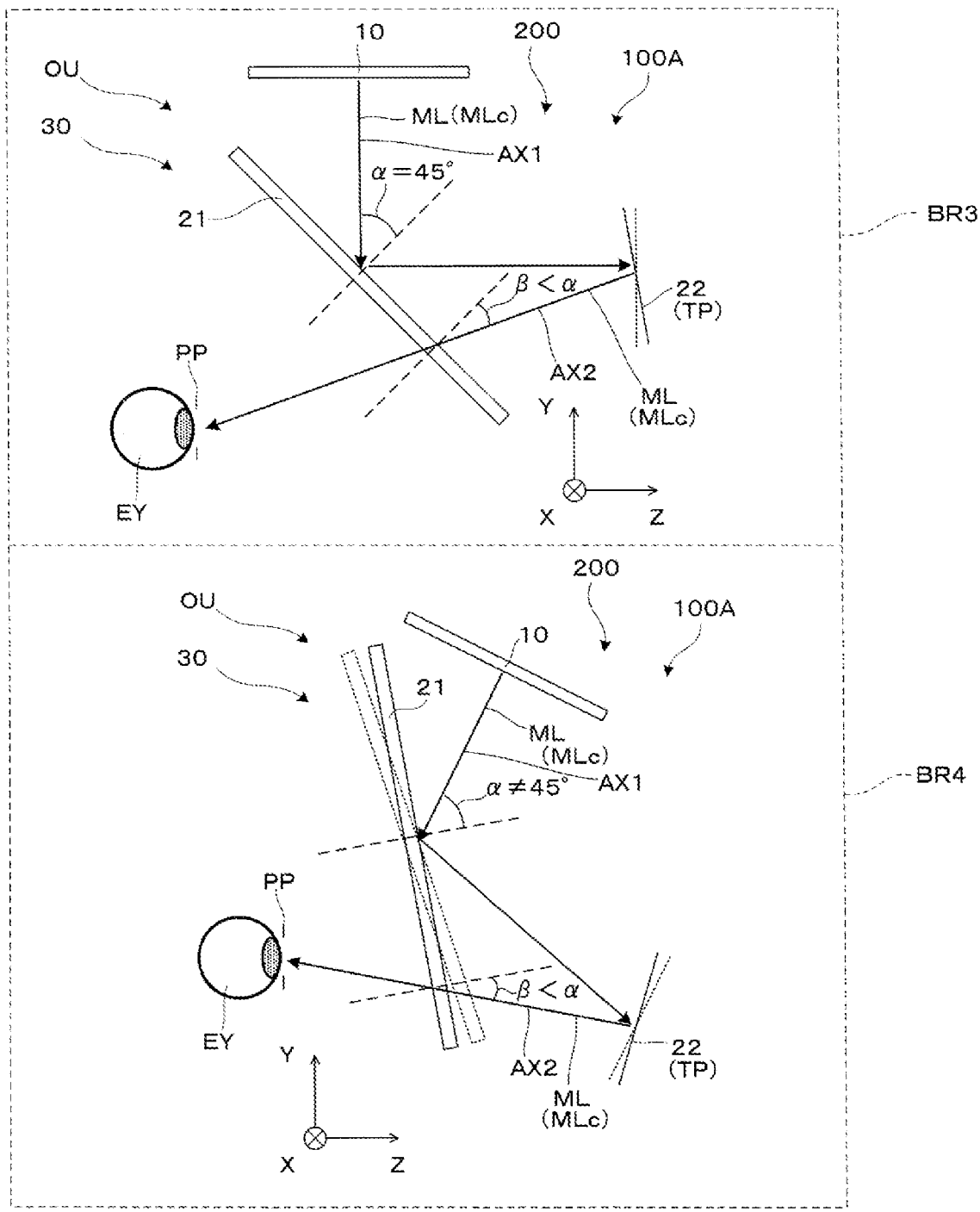
FIG. 9 is a conceptual side cross-sectional view for describing the schematic structure of the image display device.

For example, in an image display device 200X of the comparative example illustrated in a first region BR1 in FIG. 8, in an optical unit OUX, the main light beam MLc is emitted in the −Y direction from the display element 10 and incident on the first mirror 21 at the first incident angle α=45°, and a reflected component as a portion thereof is emitted in the +Z direction. That is, the first mirror 21 has a flat reflection surface whose normal direction is a direction inclined by 45° from the +Y direction to the +Z direction. The main light beam MLc emitted in the +Z direction is perpendicularly incident on the second mirror 22, and the reflected component as a portion thereof is emitted in the −Z direction. That is, the tangent plane TP of the second mirror 22 at the incident position of the main light beam MLc is a surface parallel to the XY plane. In this case, the second incident angle β is also 45°. That is, β=α=45°, and there is no difference between the first incident angle α and the second incident angle β. Therefore, separation using angle dependency, such as the angle dependent separation film 21b of the present embodiment, cannot be performed. Then, for example, it can be considered that the first mirror 21 and the second mirror 22 (tangent plane TP) are tilted from the state of the image display device 200X illustrated in the first region BR1, to generate a difference between the first incident angle α and the second incident angle β.

For example, it can be considered that, as in the image display device 200 illustrated in a second region BR2, the first mirror 21 is tilted from the state of the comparative example illustrated in the first region BR1 such that the first incident angle α becomes a value other than 45° (for example, α>45°). Accordingly, the second incident angle β becomes smaller than the first incident angle α, and separation using the angle dependency can be performed in the first mirror 21. In other words, by arranging the first mirror 21 so as to tilt with respect to the display element 10 at an angle other than 45° while keeping the state of the display element 10 as it is, a difference can be provided between the first incident angle α and the second incident angle β. As described above, a configuration in which the first mirror 21 is tilted with respect to the display element 10 such that the first incident angle α is different from 45 degrees can be considered.

Further, it can be considered that, as in the image display device 200 illustrated in a third region BR3, the second mirror 22 (tangent plane TP) is tilted from the state of the comparative example illustrated in the first region BR1 such that the second incident angle β becomes a value other than 45° (for example, β<45°). Thus, the second incident angle β becomes smaller than the first incident angle α, and separation using the angle dependency can be performed in the first mirror 21. In other words, by arranging the second mirror 22 (tangent plane TP) so as to tilt with respect to the first mirror 21 at an angle other than 45° while keeping the state of the display element 10 and the first mirror 21 as they are, a difference can be provided between the first incident angle α and the second incident angle β. As described above, a configuration in which the second mirror 22 is tilted with respect to the first mirror 21 such that the second incident angle β is different from 45 degrees can be considered.

Further, as in the image display device 200 illustrated in a fourth region BR4, both of the matters described with reference to the second region BR2 and the third region BR3 may be combined. That is, both the first mirror 21 and the second mirror 22 (tangent plane TP) may be tilted. Further, in an example illustrated in the fourth region BR4, the entire optical system is further tilted such that the main light beam MLc, which is the component light from the center pixel of the display element 10, is directed from diagonally downward toward the eye EY. That is, it is in a state of being tilted to slightly prone from the eye EY toward the second mirror 22. Similarly, the examples illustrated in FIG. 1 and the like may be configured to be a state of being tilted to slightly prone.

Further, in the above, regarding the optical unit OU, an optical axis along the main light beam MLc from the display element 10 is referred to as a first optical axis AX1, and an optical axis along the main light beam MLc from the second mirror 22 is referred to as a second optical axis AX2. Furthermore, assuming that the incidence of the imaging light ML from the direction of the first optical axis AX1 represents the first incident angle α, and the incidence of the imaging light ML from the direction of the second optical axis AX2 represents the second incident angle β. When considered in this way, in each of the above-described aspects, the first mirror 21 is tilted with respect to the display element 10 such that the first incident angle α is arranged to be an angle other than 45°, or the second mirror 22 is tilted with respect to the first mirror 21 such that the second incident angle β is arranged to be an angle other than 45°, thereby causing the first incident angle α to be greater than the second incident angle β. In addition to this, in the above-described aspect, by providing, for example, the angle dependent separation film 21b (see FIG. 3 and the like) in the first mirror 21, the first mirror 21 is caused to have a higher reflectance with respect to the component at the first incident angle α than a reflectance with respect to the component at the second incident angle β.

Second Embodiment

Next, an optical unit and an image display device according to a second embodiment will be described with reference to FIG. 10 and the like. The optical unit OU and the image display device 200 according to the present embodiment are the same as the configuration of the first embodiment except for being configured to suppress generation of distortion (distortion aberration). Accordingly, for those having the same reference numerals as those of other drawings, detailed illustrations and explanations will be omitted, and the details described with reference to other drawings will be incorporated as necessary.

Figure 10:
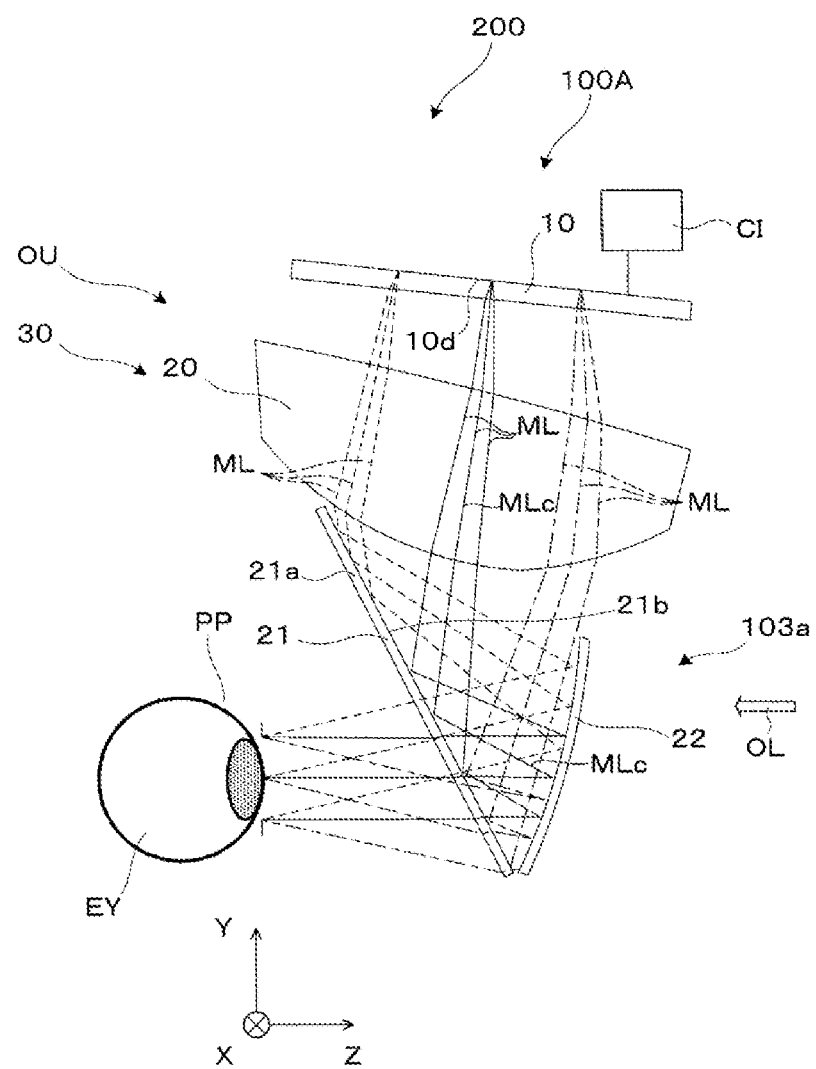
FIG. 10 is a conceptual side cross-sectional view for describing an internal optical system of the image display device according to a second embodiment.
Figure 11:
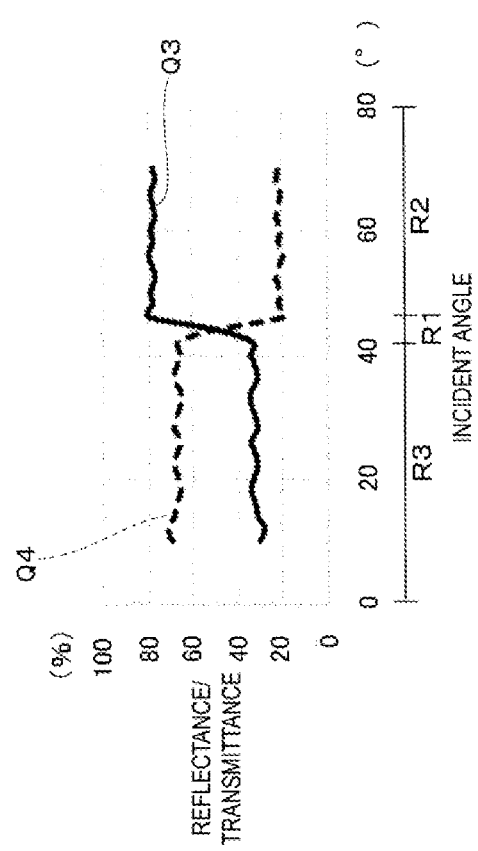
FIG. 11 is a graph illustrating an example of the separation characteristics of the angle dependent separation film.
Figure 12:
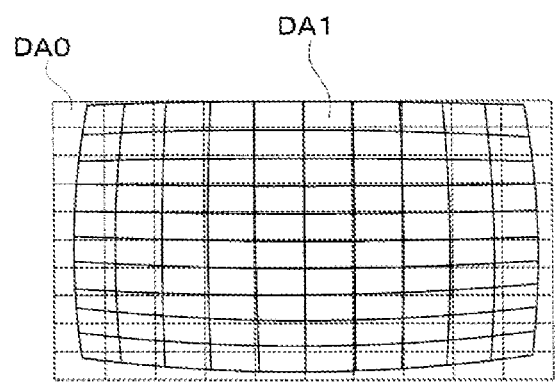
FIG. 12 is a diagram for describing the distortion correction of the display image.

FIG. 10 is a conceptual side cross-sectional view for describing an internal optical system of the image display device 200 according to the present embodiment, and is a diagram corresponding to FIG. 2. Further, FIG. 11 is a graph illustrating an example of the separation characteristics of the angle dependent separation film 21b, and is a diagram corresponding to FIG. 4. Further, Table 2 below corresponds to Table 1, and each component light is the same as that described with reference to FIG. 5. Further, FIG. 12 is a diagram for describing distortion correction of the display image, and is a diagram corresponding to FIG. 6.

TABLE 2

| INCIDENT ANGLE ON FIRST MIRROR 21 | | |
| --- | --- | --- |
| COMPONENT LIGHT | α (REFLECTION) | β (TRANSMISSION) |
| F1_0 | 57 | 25 |
| F1_+ | 52.9 | 26.4 |
| F1_− | 61 | 23.4 |
| F2_0 | 65 | 12.9 |
| F2_+ | 60.5 | 14 |
| F2_− | 69.4 | 11.7 |
| F3_0 | 49.2 | 26.5 |
| F3_+ | 44.8 | 38.2 |
| F3_− | 54.4 | 34.4 |
| F4_0 | 64.5 | 24.2 |

TABLE 2-continued

| INCIDENT ANGLE ON FIRST MIRROR 21 | | |
| --- | --- | --- |
| COMPONENT LIGHT | α (REFLECTION) | β (TRANSMISSION) |
| F4_+ | 60.2 | 24.9 |
| F4_− | 68.7 | 23.4 |
| F5_0 | 50.5 | 40.8 |
| F5_+ | 48.4 | 42.4 |
| F5_− | 55.2 | 39 |
| MAX | 69.4 | 42.4 |
| MIN | 44.8 | 11.7 |

In the first embodiment, inclination of the second mirror 22 is increased such that the separation angle between the reflection region illustrated as the angle range R2 and the transmission region illustrated as the angle range R3 in FIG. 4 becomes large, that is, the angle range R1 is made large. Along with this, distortion (distortion aberration) generated in the optical system has increased. On the other hand, in the present embodiment, a configuration in which generation of distortion (distortion aberration) in the optical system (imaging optical system 30) is reduced is employed. That is, among each optical system illustrated in FIG. 10, the second mirror 22 which is a concave mirror, and the projection lens 20 which is a projection optical system have configurations in which load of aberration correction is reduced. Therefore, for example, the difference between the corrected image DA1 and the original display image DA0 illustrated in FIG. 12 is also smaller than that illustrated in FIG. 6. However, on the other hand, the separation angle between the reflection region and the transmission region is reduced. That is, as can be seen from FIG. 11 and Table 2, a range allowed for the angle range R1 is narrow, and the reflectance may also be largely limited. Specifically, in the case illustrated in FIG. 4 and Table 1, the difference of the separation angle is 7.5° (=44.8°−37.3°), but in the case of an example illustrated in FIG. 11 and Table 2, the difference of the separation angle is reduced to approximately 2.5° (≈44.8°−) 42.4°. Note that as in the case of the first embodiment, there is no portion where the angles overlap between the transmission region and the reflection region.

Further, regarding the reflection/transmission characteristics illustrated in FIG. 11, the reflectance in the reflection region (angle range R2) illustrated by a curved line Q3 is approximately 80%, and the transmittance in the transmission region (angle range R3) illustrated by a curved line Q4 is approximately 70%. In this case, even when reflected by the first mirror 21 and transmitted again, the loss becomes equal to or less than 45%, and the efficiency is improved by approximately two times compared to the conventional case.

In the optical unit OU and the image display device 200 according to the present embodiment as well, the incident angles are made different when the imaging light ML is passed through the first mirror 21 twice, and the angle dependent separation film 21b that shows different separation characteristics according to the difference in the incident angles is provided to adjust the reflection and transmission characteristics, so that the efficiency of utilizing the imaging light ML can be improved. In particular, in the present embodiment, it is possible to improve the efficiency of utilizing the imaging light ML while suppressing generation of aberration.

Modified Examples and Others

The present disclosure is described according to each of the above-described embodiments, but the present disclosure is not limited to the above-described embodiments. The present disclosure may be carried out in various modes without departing from the gist of the present disclosure, and, for example, the following modifications may be carried out.

The imaging optical system 30 incorporated in the first display device 100A is not limited to that illustrated in the drawings, and may have various configurations. Specifically, the imaging optical system 30 is the off-axis optical system that is asymmetric in the Y direction or the vertical direction, but may also be an off-axis optical system that is asymmetric in the X direction or the horizontal direction. The optical elements constituting the imaging optical system 30 illustrated in each figure are also merely examples, and changes such as increasing or decreasing the number of lenses, adding a mirror, and adding a light guide member can be made. Further, it is also possible to use a relay optical system and the like.

A light control device that controls light by limiting transmitted light of the combiners 103a and 103b may be mounted on the external side of the combiners 103a and 103b. The light control device adjusts a transmittance, for example, electrically. Mirror liquid crystals, electronic shades, and the like may be used as the light control device. The light control device may adjust a transmittance according to outside light brightness.

The combiners 103a and 103b, that is, the second mirror 22, can also be replaced with a mirror having a light-shielding property. In this case, the optical system is a non-see-through type optical system that is not premised on direct observation of the external image.

In the description above, although it was assumed that the image display device 200 was worn on the head and is used, the image display device 200 may also be used as a hand-held display that is not worn on the head and is to be looked into like binoculars. In other words, the head-mounted display also includes a hand-held display in the present disclosure.

In the above, light is guided in the vertical direction or the Y direction, but a configuration in which light is guided in the horizontal direction or the X direction can be also employed.

Note that, in the above, the image display device 200 for both eyes is used. However, one of portions for the right eye and the left eye may be omitted from the image display devices for both eyes, and, in this case, a one-eye head-mounted display is obtained.

Further, in the aspects illustrated in the embodiments described above, in the entire imaging light ML, there is no portion where the incident angles overlap between the transmission region and the reflection region. However, an aspect in which a portion where the incident angles partially overlap occurs may be also employed. For example, in a case where, for the main light beam MLc (or the component light ML1) or a range close thereto, an angle difference is provided to sufficiently separate the first incident angle α and the second incident angle β, whereas for the peripheral side (for example, the component light ML2, and the like), the incident angles overlap, may be employed.

Further, when color unevenness or the like occurs, brightness adjustment may be performed in advance by the control circuit CI in order to suppress the color unevenness.

Further, in each of the above embodiments, the first mirror 21 is a flat mirror (half mirror), that is, an optical member having a flat plate shape. However, the first mirror 21 may be an optical member having a free curved surface shape. In this case, the free curved surface may be a gentle free curved surface close to a flat surface.

A first optical unit according to a specific aspect includes the display element configured to emit the imaging light, the first mirror having partial transparency configured to reflect a portion of the imaging light emitted from the display element, and the second mirror configured to return the imaging light reflected by the first mirror to the first mirror to form the exit pupil. The imaging light is incident on the first mirror at the first incident angle from the display element, and imaging light is incident on the first mirror at the second incident angle that is smaller than the first incident angle from the second mirror, and the first mirror includes the angle dependent separation film that exhibits different separation characteristics for the imaging light according to the difference between the first incident angle and the second incident angle.

In the above-described optical unit, the incident angles are made different when the imaging light is passed through the first mirror twice, and the angle dependent separation film that shows different separation characteristics according to the difference in the incident angle is provided to adjust the reflection and transmission characteristics, so that the efficiency of utilizing the imaging light can be improved.

In the specific aspect, the minimum angle of the first angle is greater than the maximum angle of the second angle for the imaging light of a total field of view. In this case, reflection and transmission can be separated at the total field of view.

In the specific aspect, as the separation characteristics, the angle dependent separation film shows different reflectance and transmittance characteristics between the maximum angle of the second incident angle and the minimum angle of the first incident angle. In this case, the reflection of the component incident at the first incident angle and the transmission of the component incident at the second incident angle can be performed with high efficiency as a whole.

In the specific aspect, the first mirror is a flat mirror, the second mirror is a concave mirror, and the main light beam of the center pixel of the display element is emitted from the display element to the first mirror at the first incident angle, and at the incident position where the main light beam that is reflected by the first mirror is incident on the second mirror, the main light beam is incident with an angle with respect to the normal line of the tangent plane of the second mirror. In this case, when the main light beam incident on the first mirror, which is a flat mirror, and emitted therefrom is directed again toward the first mirror through the second mirror, the main light beam can be directed toward the first mirror at an angle (second incident angle) different from the first incident angle.

In the specific aspect, the angle dependent separation film has a characteristic that causes a reflectance of a component incident at a greater angle than a predetermined angle range to be greater than 50% and that causes a transmittance of a component incident at a smaller angle than the predetermined angle range to be greater than 50%. In this case, a decrease in the amount of light when the imaging light passes through the first mirror twice can be suppressed.

In the specific aspect, the projection optical system configured to project the imaging light emitted from the display element toward the first mirror is included. In this case, the imaging light can be projected toward the first mirror in a desired state by the projection optical system.

In the specific aspect, the projection optical system includes the aberration correction optical system that corrects the aberration at the second mirror. In this case, the aberration generated due to the second mirror can be reduced in the projection optical system.

In the specific aspect, the display element includes the display surface distorted according to aberration generated by at least one of the first mirror or the second mirror. In this case, aberrations generated due to the first mirror, the second mirror, and the like can be taken into consideration and can be corrected in advance on the display element side.

In the specific aspect, the display element includes the control circuit configured to control the display region of the display surface according to aberration generated by at least one of the first mirror or the second mirror. In this case, aberrations generated due to the first mirror, the second mirror, and the like can be taken into consideration and can be corrected in advance in the control circuit of the display element.

In the specific aspect, the display element emits, as the imaging light, light including a plurality of polarization directions and in which a difference in light amount between the polarization directions is equal to or less than 50%.

In the specific aspect, in the component of the imaging light emitted from the display element as a light beam having the same field of view, the difference between the first incident angle and the second incident angle is equal to or greater than 5 degrees. In this case, angular dependent separation is easily performed.

In the specific aspect, the angle dependent separation film has the reflectance equal to or greater than a predetermined value for the components in a red wavelength band, a green wavelength band, and a blue wavelength band incident at the first incident angle. In this case, it becomes applicable to form a color image.

In the specific aspect, the second mirror is partially transparent, and returns a portion of the imaging light reflected by the first mirror and transmits a portion of the external light. In this case, a see-through optical system can be configured.

An image display device according to a specific aspect includes any of the above-described optical units. In this case, by including the optical unit, utilization efficiency of the imaging light can be improved in the image display device.

A second optical unit according to a specific aspect includes the display element configured to emit the imaging light, the first mirror configured to reflect a portion of the imaging light emitted from the display element, and the second mirror configured to return the imaging light reflected by the first mirror to the first mirror to form the exit pupil. When an angle formed by an optical axis of the imaging light emitted from the display element and a normal line of the first mirror is the first incident angle, and an angle formed by an optical axis of the imaging light reflected by the first mirror and a normal line of the second mirror is the second incident angle, the second incident angle is smaller than the first angle, and a reflectance of the first mirror for the imaging light incident thereon at the first incident angle is higher than a reflectance of the first mirror for the imaging light incident thereon at the second incident angle.

In the above-described optical unit, when the imaging light passes through the first mirror twice, the first incident angle is caused to be greater than the second incident angle, and a reflectance of the first mirror for the component at the first incident angle is higher than a reflectance of the first mirror for the component at the second incident angle, so that the efficiency of utilizing the imaging light can be improved.

In the specific aspect, the first mirror is tilted with respect to the display element such that the first incident angle is an angle different from 45 degrees. This allows the first incident angle to be greater than the second incident angle.

In the specific aspect, the second mirror is tilted with respect to the first mirror such that the second incident angle is an angle different from 45 degrees. This allows the first incident angle to be greater than the second incident angle.

A third optical unit according to a specific aspect includes the display element configured to emit the imaging light, the first mirror configured to reflect a portion of the imaging light incident thereon at the first incident angle, and the second mirror configured to return the imaging light reflected by the first mirror to cause the imaging light to be incident on the first mirror at the second incident angle. A minimum angle of the first incident angle is greater than a maximum angle of the second incident angle, and a reflectance of the first mirror for the imaging light incident thereon at the first incident angle is equal to or greater than 50%, and a reflectance of the first mirror for the imaging light incident thereon at the second incident angle is less than 50%.

In the above-described optical unit, when the imaging light passes through the first mirror twice, a minimum angle of the first incident angle is greater than a maximum angle of the second incident angle, and a reflectance of the first mirror for the imaging light incident thereon at the first incident angle is equal to or greater than 50%, and a reflectance of the first mirror for the imaging light incident thereon at the second incident angle is less than 50%, so that the efficiency of utilizing the imaging light can be improved.

What is claimed is:

1. An optical unit comprising:
a display element configured to emit imaging light,
a first mirror on which the imaging light is incident at a first angle from the display element, and configured to reflect a portion of the imaging light, and
a second mirror configured to return the imaging light, reflected by the first mirror, toward the first mirror to form an exit pupil, and to cause the imaging light to be incident on the first mirror at a second angle that is smaller than the first angle, wherein
the first mirror includes an angle dependent separation film that shows different separation characteristics for the first angle and the second angle, wherein
the display element includes a display surface distorted according to aberration generated by at least one of the first mirror or the second mirror.

2. The optical unit according to claim 1, wherein
a minimum angle of the first angle is greater than a maximum angle of the second angle for the imaging light at each angle in a total field of view.

3. The optical unit according to claim 2, wherein
the angle dependent separation film has different reflectance characteristics for different angles between the maximum angle of the second angle and the minimum angle of the first angle.

4. The optical unit according to claim 1, wherein
the first mirror is a flat mirror,
the second mirror is a concave mirror, and
a main light beam of a center pixel of the display element is emitted from the display element to the first mirror at the first angle, and at an incident position where the main light beam that is reflected by the first mirror is incident on the second mirror, the main light beam is incident with an angle with respect to a normal line of a tangent plane of the second mirror.

5. The optical unit according to claim 1, wherein
the angle dependent separation film has a characteristic that causes a reflectance of a component incident at a greater angle than a predetermined angle range to be greater than 50% and that causes a transmittance of a component incident at a smaller angle than the predetermined angle range to be greater than 50%.

6. The optical unit according to claim 1 comprising:
a projection lens configured to project the imaging light emitted from the display element toward the first mirror.

7. The optical unit according to claim 6, wherein
the projection lens corrects aberration by the second mirror.

8. The optical unit according to claim 1, wherein
the display element includes a control circuit configured to control a display region of the display surface according to aberration generated by at least one of the first mirror or the second mirror.

9. The optical unit according to claim 1, wherein
the display element emits the imaging light including a plurality of polarization directions and in which a difference in light amount between the polarization directions is equal to or less than 50%.

10. The optical unit according to claim 1, wherein
a difference between the first angle and the second angle for the imaging light of the same field of view incident on the first mirror is equal to or greater than 5 degrees.

11. The optical unit according to claim 1, wherein
the angle dependent separation film has a reflection characteristic that is equal to or greater than a predetermined value for components in a red wavelength band, a green wavelength band, and a blue wavelength band incident at the first angle.

12. The optical unit according to claim 1, wherein
the second mirror returns a portion of the imaging light reflected by the first mirror and transmits another portion of the imaging light reflected by the first mirror.

13. An image display device comprising:
the optical unit according to claim 1.

14. An optical unit comprising:
a display element configured to emit imaging light,
a first mirror configured to reflect a portion of the imaging light emitted from the display element, and
a second mirror configured to return the imaging light reflected by the first mirror to the first mirror to form an exit pupil, wherein
when an angle formed by an optical axis of the imaging light emitted from the display element and a normal line of the first mirror is a first angle, and
an angle formed by an optical axis of the imaging light reflected by the first mirror and a normal line of the second mirror is a second angle,
the second angle is smaller than the first angle, and
a reflectance of the first mirror for the imaging light incident thereon at the first angle is higher than a reflectance of the first mirror for the imaging light incident thereon at the second angle, wherein
the display element includes a display surface distorted according to aberration generated by at least one of the first mirror or the second mirror.

15. The optical unit according to claim 14, wherein
the first mirror is tilted with respect to the display element such that the first angle is an angle different from 45 degrees.

16. The optical unit according to claim 14, wherein
the second mirror is tilted with respect to the first mirror such that the second angle is an angle different from 45 degrees.

17. An optical unit comprising:
a display element configured to emit imaging light,
a first mirror configured to reflect a portion of the imaging light incident thereon at a first angle, and
a second mirror configured to return the imaging light reflected by the first mirror to cause the imaging light to be incident on the first mirror at a second angle, wherein
a minimum angle of the first angle is greater than a maximum angle of the second angle, and
a reflectance of the first mirror for the imaging light incident thereon at the first angle is equal to or greater than 50%, and a reflectance of the first mirror for the imaging light incident thereon at the second angle is less than 50%, wherein
the display element includes a display surface distorted according to aberration generated by at least one of the first mirror or the second mirror.

* * * * *